(12) United States Patent
Kim et al.

(10) Patent No.: US 8,955,874 B2
(45) Date of Patent: Feb. 17, 2015

(54) COVER AND AIRBAG DEVICE

(75) Inventors: Minhun Kim, Yokohama (JP); Jinhua Piao, Yokohama (JP); Atsushi Yamada, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 13/980,163

(22) PCT Filed: Jan. 17, 2012

(86) PCT No.: PCT/JP2012/050816
§ 371 (c)(1),
(2), (4) Date: Jul. 17, 2013

(87) PCT Pub. No.: WO2012/099105
PCT Pub. Date: Jul. 26, 2012

(65) Prior Publication Data
US 2013/0292926 A1  Nov. 7, 2013

(30) Foreign Application Priority Data

Jan. 17, 2011 (JP) ................. 2011-006914
Jan. 17, 2011 (JP) ................. 2011-006921
Jan. 28, 2011 (JP) ................. 2011-016298

(51) Int. Cl.
*B60R 21/213* (2011.01)
*B60R 21/16* (2006.01)
*B60R 21/237* (2006.01)

(52) U.S. Cl.
CPC ......... *B60R 21/213* (2013.01); *B60R 2021/161* (2013.01); *B60R 21/237* (2013.01)
USPC .................... 280/730.1; 280/728.2

(58) Field of Classification Search
CPC .. B60R 21/201; B60R 21/213; B60R 21/214; B60R 21/2176; B60R 21/2171; B60R 21/20; B60R 21/237
USPC ............................... 280/728.2, 730.1
See application file for complete search history.

(56) References Cited

U.S. PATENT DOCUMENTS 5,462,308 A * 10/1995 Seki et al. ............... 280/749
6,439,598 B1 * 8/2002 Braun et al. ............ 280/728.2
(Continued)

FOREIGN PATENT DOCUMENTS

JP  2007161169 A  6/2007
JP  2009023439 A  2/2009
(Continued)

OTHER PUBLICATIONS

Tatsuhiko Nakamura, Side Airbag Device, Mar. 11, 2010, JPO, JP 2010-052604 A, Machine Translation of Description.*
(Continued)

*Primary Examiner* — James English
(74) *Attorney, Agent, or Firm* — Brinks Gilson & Lione (57) ABSTRACT

A cover used for an airbag device capable of accurately and easily adjusting a deployment direction of an airbag during a side collision according to a deployment position. The cover includes a protecting portion formed along a rolled airbag, and a plurality of attachment portions formed so as to be attached to a body of a vehicle. The protecting portion includes a slit capable of controlling the deployment direction of the airbag by changing a position through which the tab passes toward the body of the vehicle in a rolling direction of the airbag.

10 Claims, 7 Drawing Sheets

(56) References Cited

U.S. PATENT DOCUMENTS

| | | |
|---|---|---|
| 2005/0225060 A1* | 10/2005 | Wold .................... 280/728.2 |
| 2007/0075530 A1* | 4/2007 | Yokoyama ............ 280/730.2 |
| 2009/0091102 A1* | 4/2009 | Okimoto ............... 280/728.2 |
| 2009/0091105 A1* | 4/2009 | Okimoto et al. ...... 280/728.3 |
| 2012/0267879 A1* | 10/2012 | Kim et al. ............ 280/730.2 |
| 2013/0300091 A1* | 11/2013 | Kim et al. ............ 280/728.1 |

FOREIGN PATENT DOCUMENTS

| | | |
|---|---|---|
| JP | 2010052604 A | 3/2010 |
| JP | 2011162127 A | 8/2011 |

OTHER PUBLICATIONS

Takemura et al., Occpant Crash Protection Device, JPO, JP 2007-161169 A, Machine Translation of Description.*

International Search Report of PCT/JP2012/050816, Mailed on Feb. 28, 2012, 5 pages.

* cited by examiner

COVER AND AIRBAG DEVICE

BACKGROUND OF THE INVENTION

1. Field of the Invention

The present invention relates to a cover disposed between an airbag, which is configured to be rolled from one end to the other end and be deployed upon receiving gas, and a body of a vehicle to which the airbag is attached. Moreover, the present invention relates to an airbag device including an airbag, which is configured to be rolled from one end to the other end and be deployed upon receiving gas, and a cover disposed between the airbag and a body of a vehicle to which the airbag is attached.

2. Related Technology

An airbag device is designed to protect occupants during collision by being attached to a vehicle. For occupant protection, since the airbag device needs to be deployed toward occupants from various directions, the airbag device is provided in various portions of the vehicle. Some airbag devices have an airbag provided in a folded state along an upper edge of an opening of a vehicle body (for example, a side window of a vehicle), and the airbag is deployed in a curtain shape during a side collision of the vehicle to protect the head portion and the like of an occupant.

In this type of airbag device, a folded airbag is stored in a flexible shape retaining cover formed in a cylindrical shape, for example, and the folded state is maintained. Further, the airbag is disposed such that the airbag and the shape retaining cover are covered by a protector extending in the longitudinal direction of the airbag so that the airbag does not interfere with a welded portion or the like of the vehicle body. By attaching the protector that surrounds the airbag and the shape retaining cover in this manner to the vehicle body using a bracket, for example, the airbag is attached to the vehicle body.

However, as in this type of airbag device, an airbag device having a curtain airbag that is deployed during a side collision, a deployment direction of the airbag needs to be reliably adjusted so that the deployed airbag is present between the head portion of the occupant and the window of the vehicle. Thus, it is also necessary to adjust a stored posture when storing the airbag in the shape retaining cover and when further storing the airbag stored in the shape retaining cover in the protector. To obviate this complication, an airbag device disclosed in Japanese Patent Application Laid-open No. 2009-23439 is proposed.

In the airbag device disclosed in Japanese Patent Application Laid-open No. 2009-23439, an engagement piece is formed in a protector, and an engaging portion engaging with the engagement piece is formed in a shape retaining cover. The engaging portion includes an inlet-side engagement hole, in which the engagement piece is inserted for engagement, and an outlet-side engagement hole through which an engagement hook at the tip end of the engagement piece, inserted in the inlet-side engagement hole for engagement, protrudes for engagement (see FIG. 2 of Japanese Patent Application Laid-open No. 2009-23439). With such a configuration, the airbag and the shape retaining cover are assembled into the protector to form such a unit that the airbag and the shape retaining cover are always arranged at a fixed position within the protector.

As described above, in an airbag device having a curtain airbag that is deployed during a side collision, it is necessary to reliably adjust the deployment direction of the airbag so that the deployed airbag is present between the head portion of an occupant and the window of the vehicle. When this is considered carefully, a situation that cannot be dealt with by the conventional technique may occur.

For example, when a vehicle is involved in a side collision with an obstacle such as a telegraph pole, the destroyed window glass may enter into the interior side of the vehicle. In this situation, according to the conventional technique, the entire airbag extending in the front-rear direction of the vehicle is guided so as to merely be deployed in a single direction along the window. Thus, the entire airbag is deployed very close to the window, the airbag may be damaged by the broken window glass, and the airbag may not be properly deployed.

In this situation, according to the conventional technique, the entire unitized airbag may be configured to be guided toward the inner side for each protector. However, if the entire airbag is guided toward the inner side, although it may be possible to obviate damage to the airbag caused by the broken window glass, the entire airbag is deployed also toward the inner side, and excessively large force may be applied to occupants. In particular, when the position of the head portion of an occupant is temporarily moved toward the window due to the impact during a side collision, the impact on the head portion may increase. To obviate such a situation, although it is necessary to accurately adjust the deployment direction of the airbag during a side collision according to the deployment position, the conventional technique cannot deal with this.

In order to accurately adjust the deployment direction of the airbag during a side collision according to the deployment position, the airbag may be twisted and attached to the body of the vehicle, for example, without using the unitized airbag as in the conventional technique. However, when the airbag is twisted and attached to the body of the vehicle, the twisting method may differ from operator to operator, and eliminating an individual difference between operators may lead to an increase in workload.

SUMMARY

In view of the above problems, an object of the present invention is to provide an airbag device that is ideal as an airbag device having a curtain airbag that is deployed during a side collision and that can accurately and easily adjust the deployment direction of the airbag during a side collision according to the deployment position, and a cover used for the airbag device.

In order to solve the problems, a cover according to the present invention is a cover disposed between an airbag, that is configured to be rolled from one end to the other end and be deployed upon receiving gas, and a body of a vehicle to which the airbag is attached, including: a protecting portion that is formed along the airbag rolled from one end to the other end; and a plurality of attachment portions that are formed so as to extend from the protecting portion and be attached to the body of the vehicle. A plurality of tabs attached to the body of the vehicle is formed on the other end of the airbag stored in the protecting portion.

In the present invention, since the protecting portion is formed, it is possible to prevent the airbag from making contact with a welded portion or the like on the inner surface of the body of the vehicle and from being damaged when the airbag is deployed. Since the plurality of tabs for attaching the airbag to the vehicle is formed on the other end of the airbag stored in the protecting portion, it is possible to easily attach the airbag in a state where the airbag is arranged in the protecting portion.

In the cover according to the present invention, it is preferable that deployment direction control means capable of controlling a deployment direction of the airbag by changing a position through which the tab passes toward the body of the vehicle in a rolling direction of the airbag is formed in the protecting portion.

In this manner, the deployment direction control means formed in the protecting portion controls the deployment direction of the airbag. The deployment direction control means controls the deployment direction of the airbag by changing the position through which the tab passes toward the body of the vehicle in the rolling direction of the airbag. Thus, the deployment direction of the airbag can be controlled by a simple operation of arranging the airbag in the protecting portion and passing the tab of the airbag so as to be attached to the body of the vehicle.

In the cover according to the present invention, it is preferable that the deployment direction control means includes a slit that is formed in the protecting portion and is configured to allow the tab to pass therethrough, and the slit is formed along an arrangement axis that is formed by a roll center of the airbag when the airbag is arranged along the protecting portion.

In this preferred aspect, since the slit is formed along the arrangement axis formed by the roll center of the airbag, and the deployment direction of the airbag is controlled by passing the tab through the slit, the alignment of the airbag in relation to the protecting portion becomes more reliable and easier.

In the cover according to the present invention, it is preferable that the tab includes a first tab and a second tab that are formed along the arrangement axis so as to be spaced from each other, the slit includes a first slit for allowing the first tab to pass therethrough toward the body of the vehicle and a second slit for allowing the second tab to pass therethrough toward the body of the vehicle, and the first and second slits are formed at such positions that the slits are in a twisted relation around the arrangement axis.

In this preferred aspect, since the first and second slits are formed at such position that the slits are in a twisted relation around the arrangement axis, and the first and second tabs pass through the first and second slits being at the twisted positions, the airbag can be attached in such a state that the position of the first tab and the position of the second tab are twisted. Thus, the position of the first tab and the position of the second tab can be aligned at different positions when the airbag is deployed. In this manner, the deployment direction of the airbag can be reliably adjusted by a simple method of devising the positions of the first and second slits formed in the protecting portion.

In order to solve the above problems, an airbag device according to the present invention is an airbag device including: an airbag that is configured to be rolled from one end to the other end and be deployed upon receiving gas; and a cover disposed between the airbag and a body of a vehicle to which the airbag is attached. The cover includes: a protecting portion that is formed along the airbag rolled from one end to the other end; and a plurality of attachment portions that is formed so as to extend from the protecting portion and be attached to the body of the vehicle. A plurality of tabs attached to the body of the vehicle is formed on the other end of the airbag stored in the protecting portion. Deployment direction control means capable of controlling a deployment direction of the airbag by changing a position through which the tab passes toward the body of the vehicle in a rolling direction of the airbag is formed in the protecting portion.

In the present invention, since the protecting portion is formed, it is possible to prevent the airbag from making contact with a welded portion or the like on the inner surface of the body of the vehicle and from being damaged when the airbag is deployed. Since the plurality of tabs for attaching the airbag to the vehicle is formed on the other end of the airbag stored in the protecting portion, it is possible to easily attach the airbag in a state where the airbag is arranged in the protecting portion.

Further, the deployment direction control means formed in the protecting portion controls the deployment direction of the airbag. The deployment direction control means controls the deployment direction of the airbag by changing the position through which the tab passes toward the body of the vehicle in the rolling direction of the airbag. Thus, the deployment direction of the airbag can be controlled by a simple operation of arranging the airbag in the protecting portion and passing the tab of the airbag so as to be attached to the body of the vehicle.

In the airbag device according to the present invention, it is preferable that the deployment direction control means includes a slit that is formed in the protecting portion and is configured to allow the tab to pass therethrough, and the slit is formed along an arrangement axis that is formed by a roll center of the airbag when the airbag is arranged along the protecting portion. Further, it is preferable that the airbag is rolled so that a first rolled portion rolled from one end to the other end and a second rolled portion rolled in a direction opposite to a rolling direction of the first rolled portion are formed, and the second rolled portion is formed between the slit and the first rolled portion.

When high-pressure gas is supplied from an inflator to the other end of the airbag rolled from one end to the other end, the airbag is deployed in such a manner that the other end makes contact with the protecting portion, and the contacting portion pushes the other portion. In this preferred aspect, the first and second rolled portions are formed so that the second rolled portion is disposed closer to the other end (that is, closer to the slit), whereby the airbag is deployed in such a manner that the second rolled portion pushes the first rolled portion. Further, the first rolled portion is rolled from one end to the other end, and the second rolled portion is rolled in a direction opposite to the rolling direction of the first rolled portion, whereby a folded portion is formed between the first and second rolled portions. This folded portion temporarily stores high-pressure gas to further enhance the deployment effect of the second rolled portion. Moreover, since the second rolled portion is disposed closer to the slit, the deployment of the airbag can be controlled more reliably by a combination of the deployment direction control by the slit and the deployment direction control by the second rolled portion.

The present inventors came across a new problem that may occur to the airbag device that solves the above problems. The airbag device that solves the above problems can easily and freely adjust the deployment direction of the airbag from a direction close to the window glass to a normal seating position of an occupant. When the airbag is to be deployed to a position very close to the window glass, since the airbag device is arranged above the window, the airbag may be deployed to a position where the weather strip is disposed. Thus, the deployed airbag may interfere with the weather strip, and the airbag may be caught in the weather strip, which may cause a trouble in deployment.

In order to solve such a new problem, the present inventors invented a cover capable of preventing the airbag from interfering with the weather strip.

This cover is a cover disposed between an airbag that is configured to be folded from one end to the other end and be deployed upon receiving gas and a body of a vehicle to which the airbag is attached, the cover including: a protecting portion that is formed along the airbag folded from one end to the other end; and a plurality of attachment portions that is formed so as to extend from the protecting portion and be attached to the body of the vehicle. A plurality of tabs attached to the body of the vehicle is formed on the other end of the airbag stored in the protecting portion. A slit through which the tab passes toward the body of the vehicle is formed in a portion of the protecting portion closer to the attachment portion, and deformation restricting means is formed on a side of the protecting portion opposite to the attachment portion, on a rear surface thereof opposite to a surface making contact with the airbag so as to restrict deformation of the protecting portion when the airbag is deployed.

In this cover, since the protecting portion is formed, it is possible to prevent the airbag from making contact with a welded portion or the like on the inner surface of the body of the vehicle and from being damaged when the airbag is deployed. Since the plurality of tabs for attaching the airbag to the vehicle is formed on the other end of the airbag stored in the protecting portion, it is possible to easily attach the airbag in a state where the airbag is arranged in the protecting portion.

Further, the deformation restricting means formed in the protecting portion restricts deformation of the protecting portion when the airbag is deployed. Since this deformation restricting means is formed on a side of the protecting portion opposite to the attachment portion, it is possible to restrict the deformation of the protecting portion on a side where the protecting portion is likely to be bent when the airbag making contact with the protecting portion starts to be deployed from the attachment portion. Further, since the deformation restricting means is formed on a rear surface opposite to the surface making contact with the airbag, it is possible to suppress the deformation of the protecting portion in a state where the deformation restricting means does not interfere with the airbag on the side where it does not make contact with the airbag. In the present invention, the folded shape of the airbag may be a roll shape and may be an accordion shape or a combination thereof.

It is preferable that the deformation restricting means includes a projecting portion that protrudes from the rear surface, and the projecting portion restricts deformation of the protecting portion whereby the projecting portion contacts with a weather strip of the vehicle when the airbag is deployed.

In this preferred aspect, since the projecting portion is formed so as to protrude from a rear surface on a side opposite to the attachment portion, which is a side where the protecting portion is likely to be bent when the airbag is deployed, it is possible to reliably suppress bending of the protecting portion by restricting the movement of the projecting portion. Further, since the projecting portion restricts the deformation of the protecting portion by making contact with the weather strip, it is possible to reliably prevent the protecting portion from being deformed up to the outer side of the weather strip and prevent the airbag from interfering with the weather strip.

The present inventors came across a new problem that may occur to the airbag device that solves the above problems. The airbag device that solves the above problems can easily and freely adjust the deployment direction of the airbag from a direction close to the window glass to a normal seating position of an occupant. Even when a configuration capable of adjusting the deployment direction of the airbag is employed, if actually, the deployment direction of the airbag is not stable, the effect of employing the deployment direction adjustment configuration may decrease. Thus, a new technique of further stabilizing the deployment direction of the airbag is required.

In order to solve such a new problem, the present inventors invented a cover capable of stabilizing the deployment direction of the airbag during a side collision.

This cover is a cover disposed between an airbag that is configured to be rolled from one end to the other end and be deployed upon receiving gas and a body of a vehicle to which the airbag is attached, the cover including: a protecting portion formed along the airbag rolled from one end to the other end; and a plurality of attachment portions that is formed so as to extend from the protecting portion and be attached to the body of the vehicle. A plurality of tabs attached to the body of the vehicle is formed on the other end of the airbag stored in the protecting portion, and a slit through which the tab passes toward the body of the vehicle is formed in a portion of the protecting portion closer to the attachment portion. The protecting portion includes a curved wall portion in which a curved surface is formed along a perimeter of the rolled airbag so as to include the slit and a pair of straight wall portions that extends from both ends of the curved wall portion to an outer region of the curved surface. The curved wall portion is formed along a region smaller than a semi-perimeter of the rolled airbag.

In this cover, since the protecting portion is formed, it is possible to prevent the airbag from making contact with a welded portion or the like on the inner surface of the body of the vehicle and from being damaged when the airbag is deployed. Since the plurality of tabs for attaching the airbag to the vehicle is formed on the other end of the airbag stored in the protecting portion, it is possible to easily attach the airbag in a state where the airbag is arranged in the protecting portion.

Further, since the protecting portion is configured to include the curved wall portion and the pair of straight wall portions, it is possible to reliably and easily control the deployment direction of the airbag. Specifically, the curved wall portion is configured such that a curved surface is formed along the perimeter of the rolled airbag so as to include the slit. The pair of straight wall portions is configured to extend from both ends of the curved wall portion to an outer region of the curved surface. Due to this configuration, when the airbag starts to be deployed from a position near the slit through which the tab of the airbag passes, the airbag is pushed by repulsive force of the curved wall portion in which the slit is formed in the initial stage of deployment. Since the pair of straight wall portions is configured to extend to an outer region of the curved surface, the straight wall portion may not disturb the airbag that is deployed so as to be pushed from the curved wall portion. Moreover, it is possible to suppress unnecessary expanding movement and to finely adjust the deployment direction.

It is preferable that the straight wall portion is formed substantially along a tangential line of the curved surface at the both ends of the curved wall portion.

In this preferred aspect, since the pair of straight wall portions is formed substantially along the tangential line of the end of the curved surface, the curved wall portion and the straight wall portions are connected more smoothly, and the deployment direction of the airbag can be adjusted more smoothly.

According to the present invention, it is possible to provide an airbag device capable of accurately and easily adjusting a deployment direction of the airbag during a side collision according to a deployment position and a cover used for the airbag device.

DETAILED DESCRIPTION

Hereinafter, an embodiment of the present invention will be described with reference to the accompanying drawings. For better understanding, the same constituent elements in the respective drawings will be denoted by the same reference numerals as much as possible, and redundant description is not provided.

An airbag device having a cover according to an embodiment of the present invention will be described with reference to FIGS. 1A and 1B. FIG. 1A is a schematic perspective view as seen from the interior side, showing a state where an airbag device AA is attached to the right side of a vehicle C in a moving direction. FIG. 1B is a schematic perspective view showing a state where the airbag device AA is operated from the state of FIG. 1A to deploy an airbag 10. In FIGS. 1A and 1B, an x-axis is set using a direction from the front to the rear of the vehicle C as an x-direction, a y-axis is set using a direction from the bottom to the top of the vehicle C as a y-direction, and a z-axis is set using a direction from the right to the left of the vehicle C as a z-direction. In the subsequent drawings, the x, y, and z-axes are set in the same manner.

Figure 1:
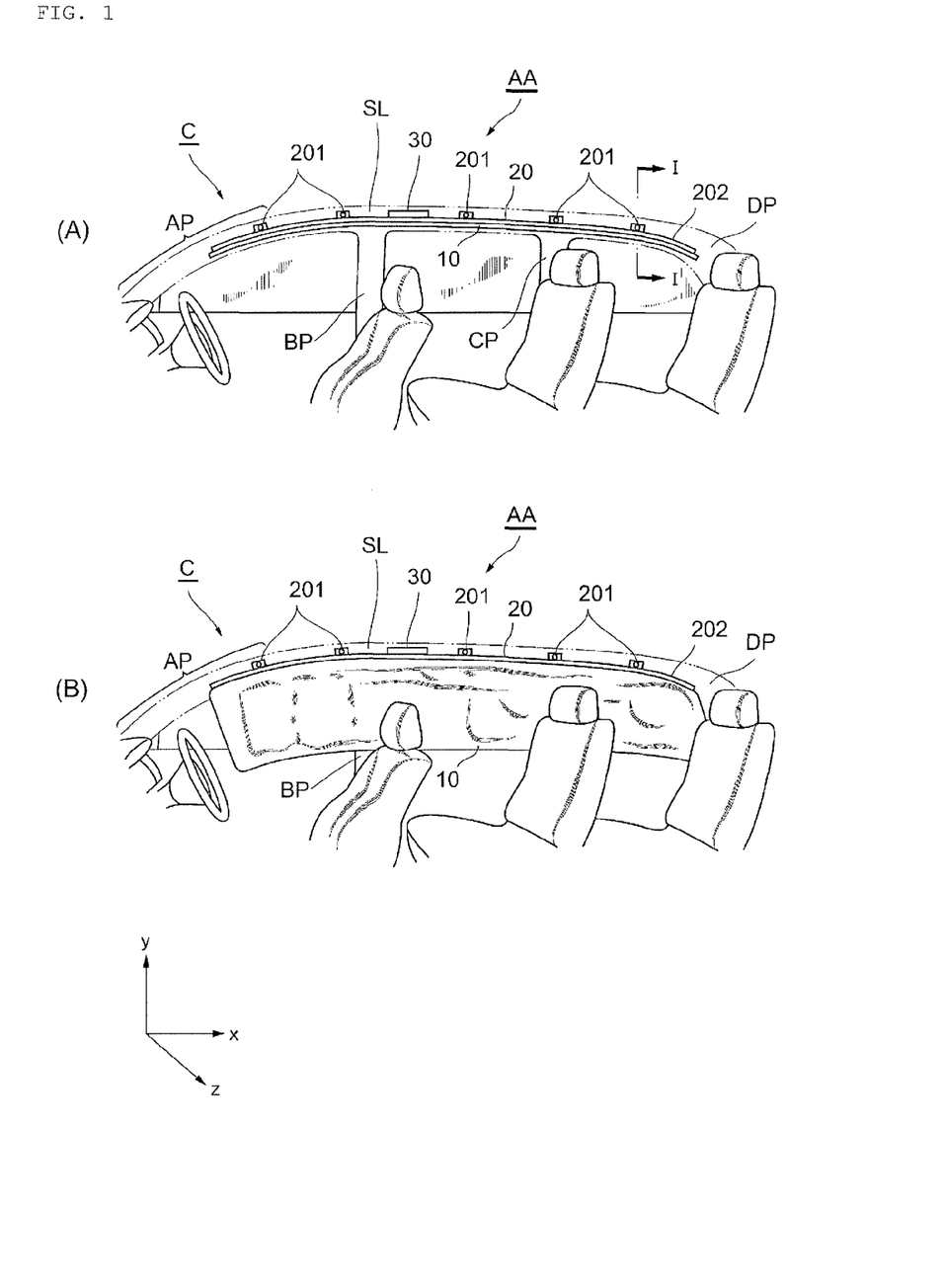
FIGS. 1A and 1B are schematic perspective views showing a state where an airbag device having a cover according to an embodiment of the present invention is attached to a vehicle.

The airbag device AA is a curtain airbag device that deploys the airbag 10 to a position near the window of the vehicle C. Although all embodiments below are described as a curtain airbag device on the right side of the vehicle C in the moving direction as shown in FIG. 1, a curtain airbag device on the left side of the vehicle C in the moving direction has the same and symmetrical structure.

As shown in FIG. 1A, the airbag device AA is stored above a side surface of a vehicle cabin. The airbag device AA is attached to a side roof rail SL. A plurality of pillars is provided in the vehicle C, that is, an A-pillar AP, a B-pillar BP, a C-pillar CP, and a D-pillar DP are arranged in this order from the front side. Portions on the interior side, of the A-pillar AP, the B-pillar BP, the C-pillar CP, and the D-pillar DP are covered by a pillar trim that is molded from a resin or the like. In the present embodiment, the airbag device AA is provided across from the A-pillar AP to the D-pillar DP.

The airbag device AA includes the airbag 10, a cover 20, and an inflator 30. The airbag 10 is provided so as to extend in the front-rear direction (x-axis direction) of the vehicle C. The airbag 10 is arranged along the cover 20 in a state where the airbag 10 is rolled from one end to the other end. The airbag 10 is formed in a bag shape by sewing base fabrics that constitute the front and rear surfaces thereof or by weaving using one-piece woven (OPW).

The inflator 30 is a cylinder inflator and supplies gas to the airbag 10 from a suitably-determined position at the upper end of the airbag 10. The inflator 30 is configured to operate when a side collision or a rollover (overturn) occurs to the vehicle C. Specifically, when a side collision or a rollover occurs, a sensor (not shown) provided in the vehicle C detects an impact and sends an ignition signal to the inflator 30. Then, an explosive in the inflator 30 burns to generate gas which is supplied to the airbag 10.

The cover 20 includes a protecting portion 202 that is formed along the airbag 10 that is rolled from one end to the other end and a plurality of attachment portions 201 that extends from the protecting portion 202 so as to be attached to a body (a side roof rail SL) of the vehicle C.

Figure 2:
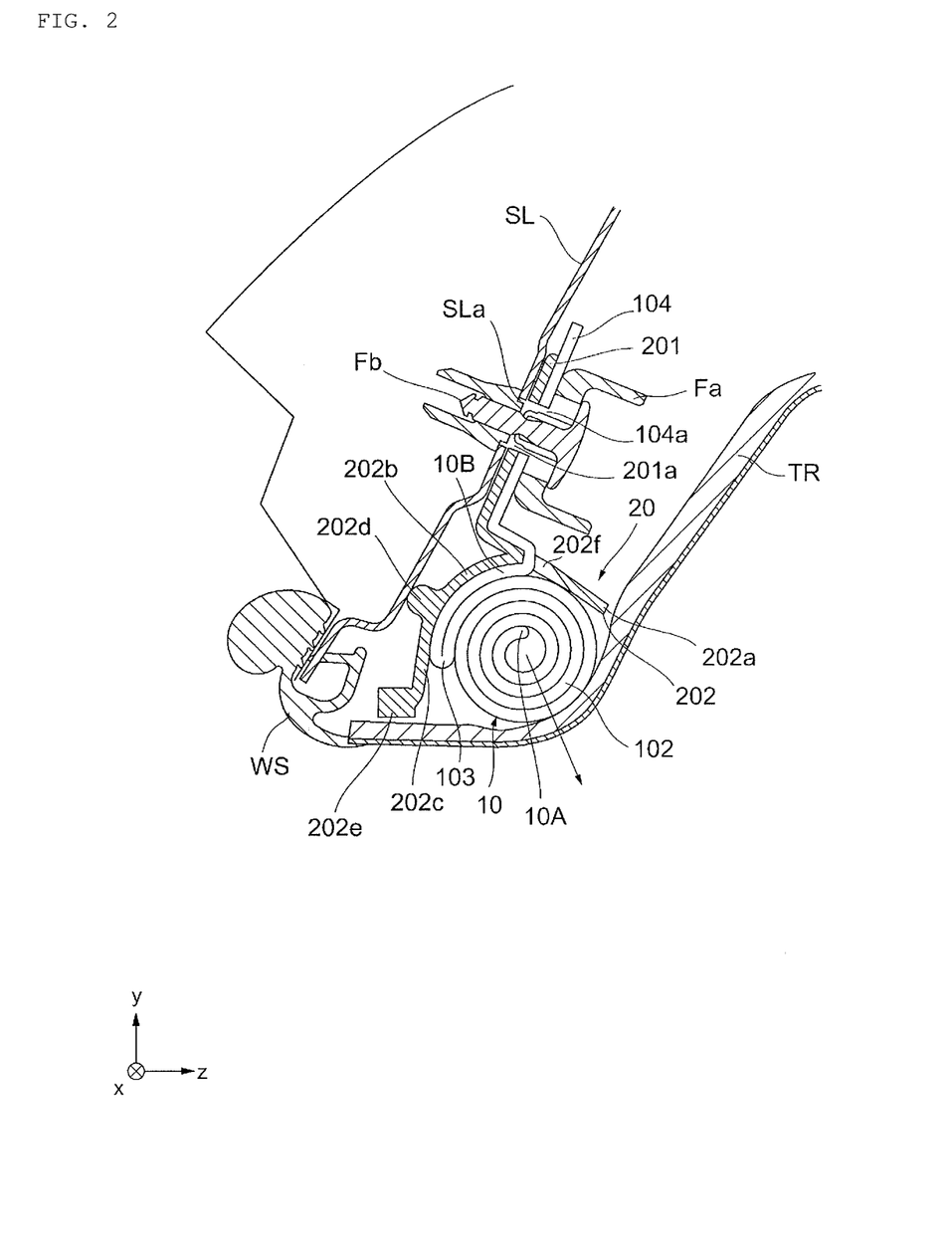
FIG. 2 is a schematic cross-sectional view along line I-I in FIG. 1.

Next, the airbag 10 and the cover 20 will be described further with reference to FIG. 2. FIG. 2 is a schematic cross-sectional view along line I-I in FIG. 1. As shown in FIG. 2, a weather strip WS is provided on a lower end of the side roof rail SL so as to be inserted between a door (not shown in FIG. 2) and the side roof rail SL. A roof trim TR is provided in contact with the weather strip WS. The airbag 10 and the cover 20 are disposed in a space formed by the side roof rail SL, the weather strip WS, and the roof trim TR.

The airbag 10 is rolled from one end 10A to the other end 10B. A tab 104 attached to the body of the vehicle C is formed on the other end 10B of the airbag 10. Although only one tab 104 is depicted in FIG. 2, a plurality of tabs 104 are formed in the entire airbag 10. A tab attachment hole 104a is formed in the tab 104.

The airbag 10 includes a first rolled portion 102 that is rolled from one end 10A to the other end 10B and a second rolled portion 103 that is rolled by being folded in a direction opposite to the rolling direction of the first rolled portion 102. The second rolled portion 103 is formed between the tab 104 and the first rolled portion 102. Thus, the first rolled portion 102 is formed near one end 10A, and the second rolled portion 103 is formed near the other end 10B. The airbag 10 is disposed to be in contact with the inner side of the roof trim TR.

The cover 20 includes the attachment portion 201 and the protecting portion 202. The protecting portion 202 is a portion that is formed along the rolled airbag 10 and protects the airbag 10 so as not to be damaged by preventing the airbag 10 from making contact with a body such as the side roof rail SL.

The protecting portion 202 includes a first straight wall portion 202a, a curved wall portion 202b, and a second straight wall portion 202c. The curved wall portion 202b is a portion where a curved surface is formed along the perimeter of the rolled airbag 10. A slit 202f is formed in the curved wall portion 202b.

The slit 202f is a portion of the curved wall portion 202b closer to the attachment portion 201 of the protecting portion 202. The slit 202f is a gap through which the tab 104 of the airbag 10 passes from a side of the airbag 10 closer to the first and second rolled portions 102 and 103 toward the side roof rail SL which is the body of the vehicle C. The slit 202f is formed so as to correspond to a position where the tab 104 is formed.

The slit 202f is formed in a rectangular shape along an arrangement axis formed by the roll center (one end 10A) of the airbag 10 when the airbag 10 is arranged along the protecting portion 202. Although the arrangement axis formed by the roll center of the airbag 10 is a curved axis if the airbag 10 is arranged to be curved, the arrangement axis is an axis extending substantially along the x-axis in FIG. 2. The slit 202f does not need to be formed strictly in parallel to the x-axis, but the slit 202f may be inclined in relation to the x-axis as long as the tab 104 can pass through the slit 202f of the airbag 10.

The curved wall portion 202b is formed such that an angle of the arc thereof is 180° or smaller when the curved wall portion 202b is seen from a direction of confronting FIG. 2 (a direction of seeing through the x-axis). In other words, the curved wall portion 202b is formed along a region smaller than a half (semicircle or semi-perimeter) of the perimeter of the rolled airbag 10.

The first and second straight wall portions 202a and 202c are connected to both ends of the curved wall portion 202b. The first straight wall portion 202a is formed so as to be connected to an interior-side end of the curved wall portion 202b. The second straight wall portion 202c is formed so as to be connected to an exterior-side end of the curved wall portion 202b. Thus, the second straight wall portion 202c is formed closer to the side roof rail SL and the weather strip WS.

A first projecting portion 202d is formed on the curved wall portion 202b. The first projecting portion 202d is formed on a surface of the curved wall portion 202b facing the side roof rail SL and opposite to the surface making contact with the airbag 10. The first projecting portion 202d is formed so as to make contact with the side roof rail SL. Thus, even when the airbag 10 is deployed, it is possible to reliably push the airbag 10 in a certain direction while preventing movement of the curved wall portion 202b.

A second projecting portion 202e is formed on the second straight wall portion 202c. The second projecting portion 202e is formed on a surface of the second straight wall portion 202c facing the side roof rail SL and opposite to the surface making contact with the airbag 10. The second projecting portion 202e is formed in a lower end of the second straight wall portion 202c.

The attachment portion 201 is formed so as to extend from the protecting portion 202 and be attached to the body of the vehicle C. A cover attachment hole 201a is formed in the attachment portion 201. The attachment portion 201 is formed so as to extend from a portion near the slit 202f formed in the curved wall portion 202b to a side opposite to the surface making contact with the airbag 10.

A body attachment hole SLa is formed in the side roof rail SL. Fasteners Fa and Fb are inserted into the body attachment hole SLa. The airbag 10 and the cover 20 are fixed to the side roof rail SL by the fasteners Fa and Fb.

The airbag 10 is integrated with the cover 20 in such a manner that the first and second rolled portions 102 and 103 are brought into contact with the curved wall portion 202b and the first and second straight wall portions 202a and 202c of the cover 20 and the tab 104 is passed through the slit 202f. The cover 20 and the airbag 10 are brought into contact with the side roof rail SL in a state where the tab attachment hole 104a formed in the tab 104 of the airbag 10 overlaps the cover attachment hole 201a formed in the attachment portion 201 of the cover 20. In this case, the tab attachment hole 104a, the cover attachment hole 201a, and the body attachment hole SLa are arranged so as to overlap.

After the tab attachment hole 104a, the cover attachment hole 201a, and the body attachment hole SLa are arranged so as to overlap, the fastener Fa is inserted into the holes from the interior side. A hole is formed at the center of the fastener Fa, and the fastener Fb is inserted into this hole, whereby the fastener Fa is fixed in an expanded state.

When gas is introduced to deploy the airbag 10 shown in FIG. 2, the airbag 10 is deployed in a direction indicated by an arrow in the figure. When gas is introduced into the airbag 10, inflation progresses first in the second rolled portion 103 and the airbag 10 is deployed according to repulsive force of the second rolled portion 103 pressing the curved wall portion 202b.

The deployment direction is also affected by the position at which the slit 202f is formed. A case where the position of the slit 202f is changed will be described with reference to FIG. 3.

Figure 3:
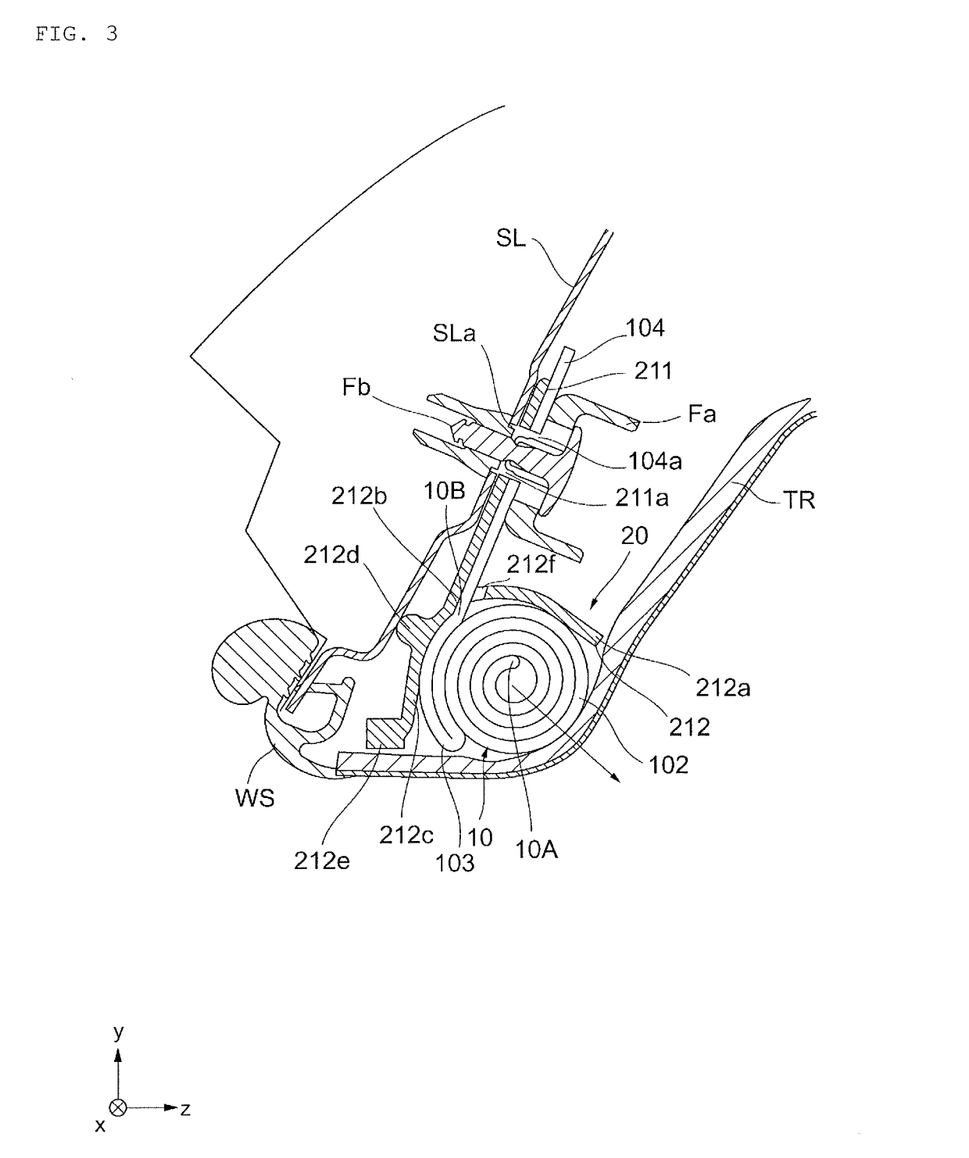
FIG. 3 is a schematic cross-sectional view showing an example where the airbag of FIG. 2 is attached in a twisted manner.

FIG. 3 is a schematic cross-sectional view showing an example where the airbag 10 of FIG. 2 is attached in a radially spaced or twisted manner. In FIG. 3, the position of the slit on the cover 20 is changed.

As shown in FIG. 3, the cover 20 includes an attachment portion 211 and a protecting portion 212. The protecting portion 212 includes a first straight wall portion 212a, a curved wall portion 212b, and a second straight wall portion 212c. The curved wall portion 212b is a portion where a curved surface is formed along the perimeter of the rolled airbag 10. A slit 212f is formed in the curved wall portion 212b.

The slit 212f is a portion of the curved wall portion 212b closer to the attachment portion 211 of the protecting portion 212. The slit 212f is a gap through which the tab 104 of the airbag 10 passes from a side of the airbag 10 closer to the first and second rolled portions 102 and 103 toward the side roof rail SL which is the body of the vehicle C. The slit 212f is formed so as to correspond to a position where the tab 104 is formed.

The slit 212f is formed in a rectangular shape axially along an arrangement axis formed by the roll center (one end 10A) of the airbag 10 when the airbag 10 is arranged along the protecting portion 212. The slit 212f is formed at such a position that the slit 212f is twisted closer to the side roof rail SL than the slit 202f shown in FIG. 2.

A first projecting portion 212d is formed on the curved wall portion 212b. The first projecting portion 212d is formed on a surface of the curved wall portion 212b facing the side roof rail SL and opposite to the surface making contact with the airbag 10. The first projecting portion 212d is formed so as to make contact with the side roof rail SL.

A second projecting portion 212e is formed on the second straight wall portion 212c. The second projecting portion 212e is formed on a surface of the second straight wall portion 212c facing the side roof rail SL and opposite to the surface making contact with the airbag 10. The second projecting portion 212e is formed in a lower end of the second straight wall portion 212c.

When gas is introduced to deploy the airbag 10 shown in FIG. 3, the airbag 10 is deployed in a direction indicated by an arrow in the figure. When gas is introduced into the airbag 10, inflation progresses first in the second rolled portion 103 and the airbag 10 is deployed according to repulsive force of the second rolled portion 103 pressing the curved wall portion 212b.

When the deployment direction of the airbag 10 shown in FIG. 2 is compared with the deployment direction of the airbag 10 shown in FIG. 3, the deployment direction of the airbag 10 shown in FIG. 2 is a direction close to a relatively perpendicular direction, and the deployment direction of the airbag 10 shown in FIG. 3 is a direction toward a relatively high interior side of the vehicle. Thus, as in the case the slits 202f and 212f shown in FIGS. 2 and 3, respectively, by forming slits at different positions in the longitudinal direction of the same cover 20 such that the slits are in a twisted relation, it is possible to control the deployment direction of the airbag 10 easily.

Figure 4:
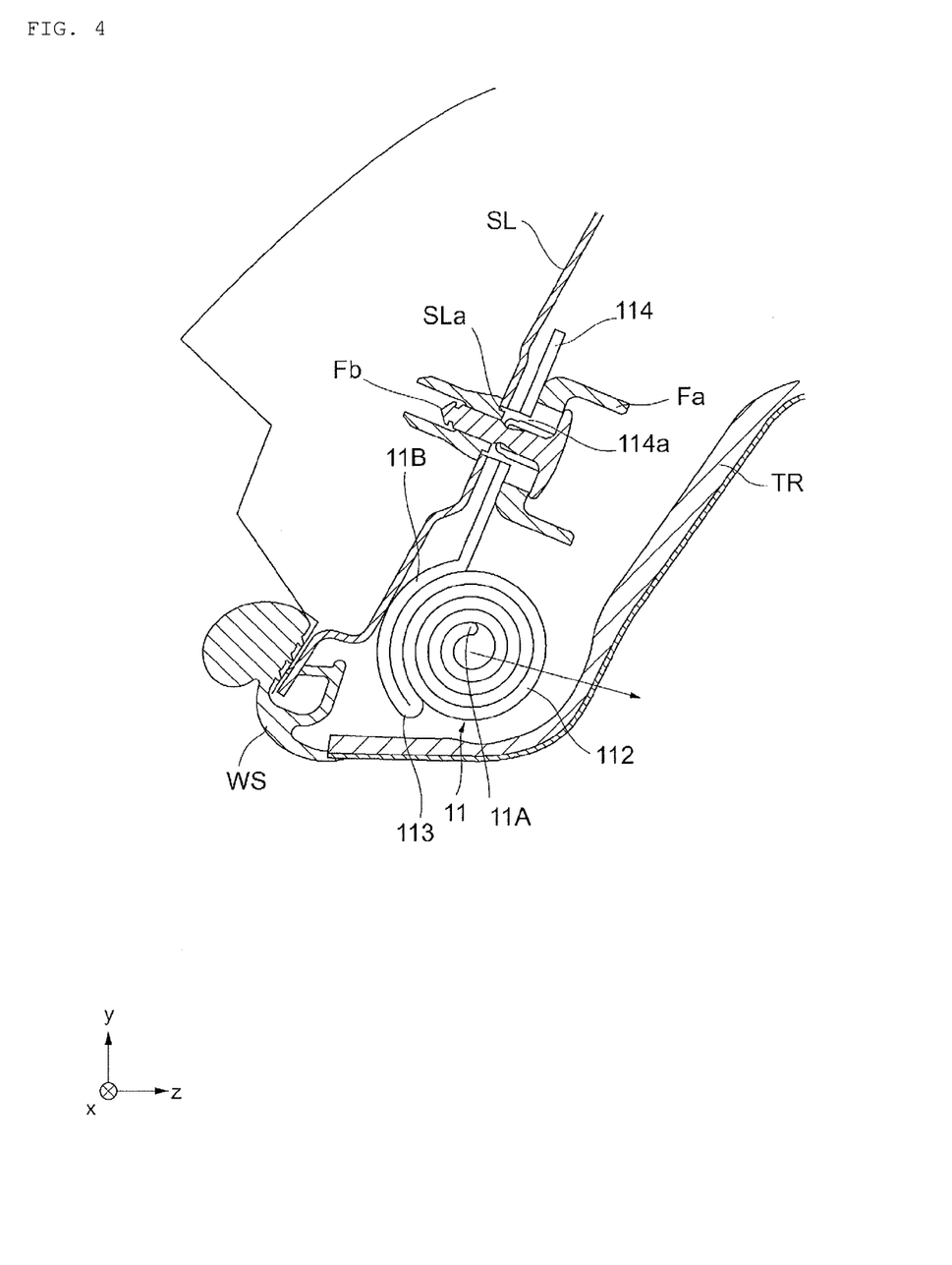
FIG. 4 is a schematic cross-sectional view showing a state where the cover of FIG. 2 is removed for comparison purpose.

For comparison, an example where the cover 20 is not attached is shown in FIG. 4. As shown in FIG. 4, if the airbag 10 is directly attached without attaching the cover 20, the airbag 10 may make direct contact with the side roof rail SL during deployment of the airbag 10. Thus, it is not possible to control the deployment direction of the airbag 10.

In the above-described embodiment, the deformation of the curved wall portions 202b and 212b is prevented by allowing the first projecting portions 202d and 212d formed in the curved wall portions 202b and 212b, respectively to make contact with the side roof rail SL, however, the countermeasure to prevent deformation of the cover is not limited to this.

Figure 5:
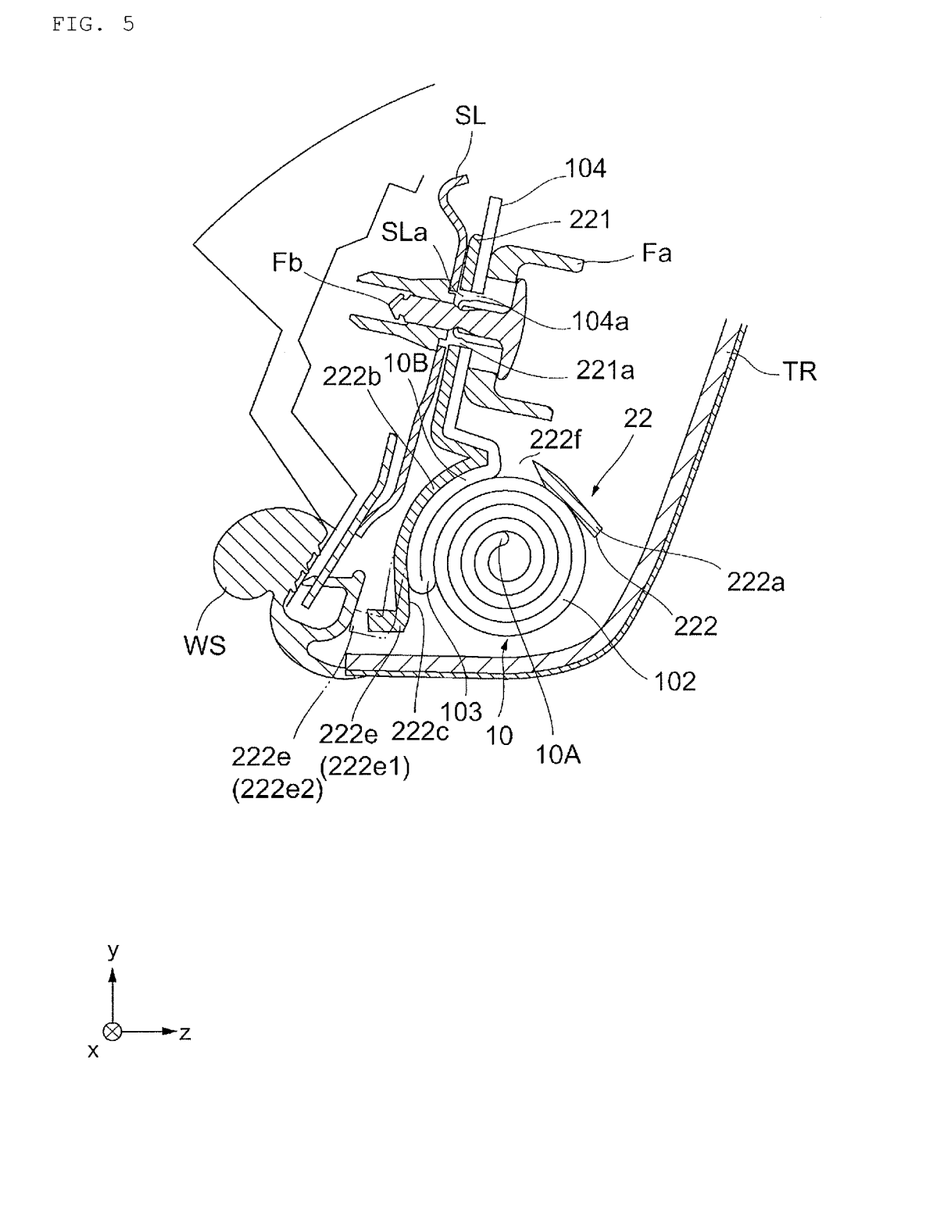
FIG. 5 is a schematic cross-sectional view showing a modification of FIG. 2.

FIG. 5 shows a modification of the countermeasure to prevent deformation of the cover. As shown in FIG. 5, a cover 22 includes an attachment portion 221 and a protecting portion 222. The attachment portion 221 is formed so as to extend from the protecting portion 222 and be attached to the body of the vehicle C. A cover attachment hole 221a is formed in the attachment portion 221. On the other hand, the protecting portion 222 is formed along the rolled airbag 10.

The protecting portion 222 includes a first straight wall portion 222a, a curved wall portion 222b, and a second straight wall portion 222c. The curved wall portion 222b is a portion where a curved surface is formed along the perimeter of the rolled airbag 10. A slit 222f is formed in the curved wall portion 222b. The slit 222f corresponds to the slit 202f shown in FIG. 2.

The curved wall portion 222b is formed such that an angle of the arc thereof is 180° or smaller when the curved wall portion 222b is seen from a direction of confronting FIG. 5 (a direction of seeing through the x-axis). In other words, the curved wall portion 222b is formed along a region smaller than a half (semicircle or semi-perimeter) of the perimeter of the rolled airbag 10.

The first and second straight wall portions 222a and 222c are connected to both ends of the curved wall portion 222b. The first straight wall portion 222a is formed so as to be connected to an interior-side end of the curved wall portion 222b. The second straight wall portion 222c is formed so as to be connected to an exterior-side end of the curved wall portion 222b. Thus, the second straight wall portion 222c is formed closer to the side roof rail SL and the weather strip WS.

In this example, a projection corresponding to the first projecting portion 202d shown in FIG. 2 is not formed. On the other hand, a second projecting portion 222e is formed on the second straight wall portion 222c. The second projecting portion 222e is formed on a surface of the second straight wall portion 222c facing the side roof rail SL and opposite to the surface making contact with the airbag 10. The second projecting portion 222e is formed in a lower end of the second straight wall portion 222c.

When gas is introduced into the airbag 10 shown in FIG. 5, inflation progresses first in the second rolled portion 103 and the airbag 10 is deployed according to repulsive force of the second rolled portion 103 pressing the curved wall portion 222b. When the second rolled portion 103 presses the curved wall portion 222b, the curved wall portion 222b is bent so that the second straight wall portion 222c is pressed toward the weather strip WS. Thus, the second projecting portion 222e moves from a position 222e1 to a position 222e2 indicated by a two-dot chain line and makes contact with the weather strip WS. In this manner, when the second projecting portion 222e makes direct contact with the weather strip WS, further deformation of the cover 22 is suppressed. Moreover, it is possible to reliably prevent the deployed airbag 10 from being caught in the weather strip WS.

In the cover 22 described with reference to FIG. 5, since an initial deployment point of the airbag 10 is present in the second rolled portion 103, the position of the slit 222f is set with a deployment aspect of the airbag 10. This is because the second rolled portion 103 which is the initial deployment point is close to the curved wall portion 222b. When the initial deployment point of the airbag 10 is moved, it is more preferable to change the position of the slit. Modifications stemming from this perspective will be described with reference to FIGS. 6 and 7.

Figure 6:
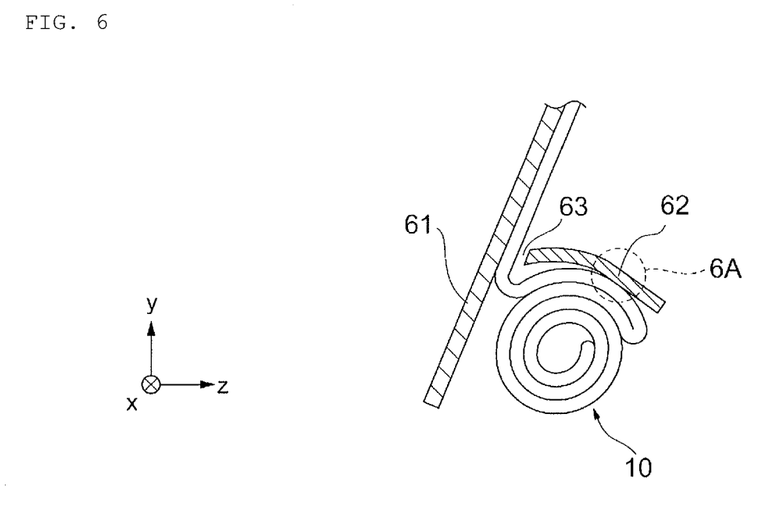
FIG. 6 is a schematic cross-sectional view showing a modification of FIG. 5.

In the example shown in FIG. 6, an initial deployment point of the airbag 10 is a region 6A. The region 6A is a region in which a wall 62 (corresponding to the first straight wall portion 222a of FIG. 5) and the airbag 10 make contact. Thus, as compared to the case shown in FIG. 5, the initial deployment point of the airbag 10 is moved to the opposite side in relation to the roll center of the airbag 10. To deal with this, a slit 63 (corresponding to the slit 222f of FIG. 5) is offset toward a wall 61 (corresponding to the curved wall portion 222b and the second straight wall portion 222c of FIG. 5).

Figure 7:
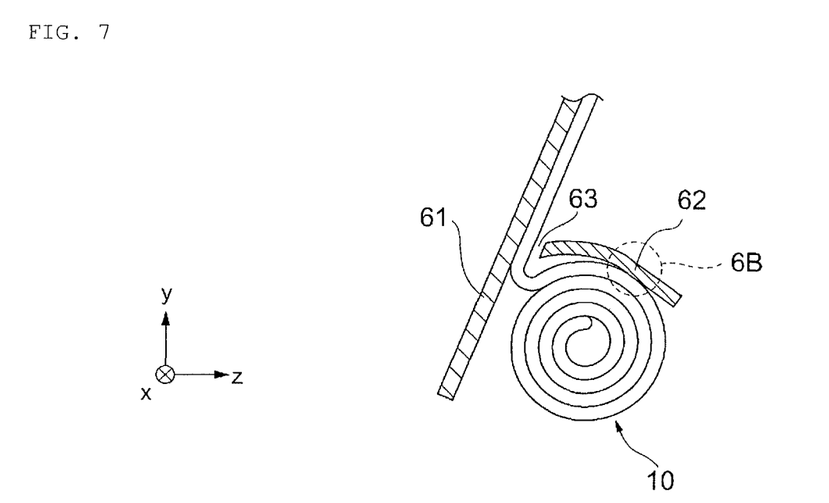
FIG. 7 is a schematic cross-sectional view showing a modification of FIG. 5.

In the example shown in FIG. 7, the rolling method of the airbag 10 is changed. In this case, the initial deployment point of the airbag 10 is a region 6B. The region 6B is a region in which a wall 62 (corresponding to the first straight wall portion 222a of FIG. 5) and the airbag 10 make contact. Thus, as compared to the case shown in FIG. 5, the initial deployment point of the airbag 10 is moved to the opposite side in relation to the roll center of the airbag 10. To deal with this, a slit 63 (corresponding to the slit 222f of FIG. 5) is offset toward a wall 61 (corresponding to the curved wall portion 222b and the second straight wall portion 222c of FIG. 5).

As described above, the cover 20 according to the present embodiment is a cover disposed between the airbag 10, which is configured to be rolled from one end 10A to the other end 10B and be deployed upon receiving gas, and a body of the vehicle C to which the airbag 10 is attached. The cover 20 includes the protecting portion 202 or 212 that is formed along the rolled airbag 10 and a plurality of attachment portions 201 or 211 that extends from the protecting portion 202 or 212 so as to be attached to the body of the vehicle C. A plurality of tabs 104 attached to the body of the vehicle C is formed on the other end 10B of the airbag 10 stored in the protecting portion 202 or 212. The slits 202f and 212f are formed in the protecting portion 202 or 212 as deployment direction control means capable of controlling the deployment direction of the airbag 10 by changing the position through which the tab 104 passes toward the body of the vehicle C in the rolling direction (the direction around the x-axis in FIGS. 2 and 3) of the airbag 10.

In the present embodiment, since the protecting portion 202 or 212 is formed, it is possible to prevent the airbag 10 from making contact with a welded portion or the like on the inner surface of the body of the vehicle C and from being damaged when the airbag 10 is deployed. Since a plurality of tabs 104 for attaching the airbag 10 to the vehicle C is formed on the other end 10B of the airbag 10 stored in the protecting portion 202 or 212, it is possible to easily attach the airbag 104 in a state where the airbag 104 is arranged in the protecting portion 202 or 212.

Further, the slits 202f and 212f formed in the protecting portion 202 or 212 as deployment direction control means controls the deployment direction of the airbag 10. Since the slits 202f and 212f are formed as the deployment direction control means, it is possible to reliably and easily change the position through which the tab 104 passes toward the body of the vehicle C in the rolling direction of the airbag 10. Thus, the deployment direction of the airbag 10 can be controlled by a simple operation of arranging the airbag 10 in the protecting portion 202 and passing the tab 104 of the airbag 10 so as to be attached to the body of the vehicle C.

In the present embodiment, the slits 202f and 212f are formed along the arrangement axis formed by the roll center of the airbag 10 when the airbag 10 is arranged along the protecting portion 202. In this manner, since the slits 202f and 212*f* are formed along the arrangement axis formed by the roll center of the airbag 10, and the deployment direction of the airbag 10 is controlled by passing the tab 104 through the slits 202*f* and 212*f*, the alignment of the airbag 10 in relation to the protecting portion 202 becomes more reliable and easier.

In the present embodiment, the tabs 104 include a tab 104 functioning as a first tab and a tab 104 functioning as a second tab, formed to be spaced from each other along the arrangement axis, and the tab 104 as the first tab passes through the slit 202*f* as a first slit whereas the tab 104 as the second tab passes through the slit 212*f* as a second slit. Moreover, the slits 202*f* and 212*f* as the first and second slits are formed at such positions that the slits are in a twisted relation around the arrangement axis.

Due to this configuration, the airbag 10 can be attached in such a state that the position of the first tab 104 and the position of the second tab 104 are twisted. Thus, the position of the first tab and the position of the second tab can be aligned at different positions when the airbag 10 is deployed. In this manner, the deployment direction of the airbag 10 can be reliably adjusted by a simple method of devising the positions of the slits 202*f* and 212*f* formed in the protecting portion 202.

In the present embodiment, the first and second rolled portions 102 and 103 are formed so that the second rolled portion 103 is disposed closer to the other end 10B (that is, closer to the slits 202*f* and 212*f*), whereby the airbag 10 is deployed in such a manner that the second rolled portion 103 pushes the first rolled portion 102. Further, the first rolled portion 102 is rolled from one end 10A to the other end 10B, and the second rolled portion 103 is rolled in a direction opposite to the rolling direction of the first rolled portion 102, whereby a folded portion is formed between the first and second rolled portions 102 and 103. This folded portion temporarily stores high-pressure gas to further enhance the deployment effect of the second rolled portion 103. Moreover, since the second rolled portion 103 is disposed closer to the slits 202*f* and 212*f*, the deployment of the airbag 10 can be controlled more reliably by a combination of the deployment direction control by the slits 202*f* and 212*f* and the deployment direction control by the second rolled portion 103.

As described above, the cover 20 according to the present embodiment is a cover disposed between the airbag 10 that is configured to be rolled from one end 10A to the other end 10B and be deployed upon receiving gas and a body of the vehicle C to which the airbag 10 is attached. The cover 20 includes the protecting portion 202 or 212 that is formed along the rolled airbag 10 and a plurality of attachment portions 201 or 211 that extends from the protecting portion 202 or 212 so as to be attached to the body of the vehicle C. A plurality of tabs 104 attached to the body of the vehicle C is formed on the other end 10B of the airbag 10 stored in the protecting portion 202 or 212. The slit 202*f* or 212*f* through which the tab 104 passes toward the body of the vehicle C is formed in a portion of the protecting portion 202 closer to the attachment portion 201, and the first projecting portion 202*d* or 212*d* is formed on a rear surface of the protecting portion 202 opposite to the surface making contact with the airbag 10 as deformation restricting means that restricts deformation of the protecting portion 202 or 212 when the airbag 10 is deployed.

In the present embodiment, since the protecting portion 202 or 212 is formed, it is possible to prevent the airbag 10 from making contact with a welded portion or the like on the inner surface of the body of the vehicle C and from being damaged when the airbag 10 is deployed. Since a plurality of tabs 104 for attaching the airbag 10 to the vehicle C is formed on the other end 10B of the airbag 10 stored in the protecting portion 202 or 212, it is possible to easily attach the airbag 104 in a state where the airbag 104 is arranged in the protecting portion 202 or 212.

Further, the first projecting portion 202*d* or 212*d* formed in the protecting portion 202 or 212 as deformation restricting means restricts the deformation of the protecting portion 202 or 212 when the airbag 10 is deployed.

The projecting portion functioning as the deformation restricting means is preferably provided on a side of the protecting portion 202 or 212 opposite to the attachment portion 201 or 211. This preferred example is shown in FIG. 5. Since the second projecting portion 222*e* as the deformation restricting means shown in FIG. 5 is formed on a side of the protecting portion 222 opposite to the attachment portion 221, it is possible to restrict the deformation of the protecting portion 222 on a side where the protecting portion 222 is likely to be bent when the airbag 10 making contact with the protecting portion 222 starts to be deployed from the attachment portion 221. Further, since the second projecting portion 222*e* is formed on a surface opposite to the surface making contact with the airbag 10, it is possible to suppress deformation of the protecting portion 222 in a state where the second projecting portion 222*e* does not interfere with the airbag 10 on the side where it does not make contact with the airbag 10.

In this aspect, since the second projecting portion 222*e* is formed so as to protrude from a rear surface on a side opposite to the attachment portion 221, which is a side where the protecting portion 222 is likely to be bent when the airbag 10 is deployed, it is possible to reliably suppress bending of the protecting portion 222 by restricting the movement of the second projecting portion 222*e*. Further, since the second projecting portion 222*e* restricts the deformation of the protecting portion 222 by making contact with the weather strip WS, it is possible to reliably prevent the protecting portion 222 from being deformed up to the outer side of the weather strip WS and prevent the airbag 10 from interfering with the weather strip WS.

As described above, the cover 20 according to the present embodiment is a cover disposed between the airbag 10 that is configured to be rolled from one end 10A to the other end 10B and be deployed upon receiving gas and a body of the vehicle C to which the airbag 10 is attached. The cover 20 includes the protecting portion 202 that is formed along the rolled airbag 10 and a plurality of attachment portions 201 that extends from the protecting portion 202 so as to be attached to the body of the vehicle C. A plurality of tabs 104 attached to the body of the vehicle C is formed on the other end 10B of the airbag 10 stored in the protecting portion 202. The protecting portion 202 or 212 includes the curved wall portion 202*b* or 212*b* in which a curved surface is formed along the perimeter of the rolled airbag 10 so as to include the slit 202*f* or 212*f* and a pair of straight wall portions 202*a* and 202*c* and 212*a* and 212*c* that extends from both ends of the curved wall portion 202*b* or 212*b* to an outer region of the curved surface. The curved wall portion 202*b* or 212*b* is formed along a smaller region than the semi-perimeter of the rolled airbag 10.

In the present embodiment, since the protecting portion 202 or 212 is formed, it is possible to prevent the airbag 10 from making contact with a welded portion or the like on the inner surface of the body of the vehicle C and from being damaged when the airbag 10 is deployed. Since a plurality of tabs 104 for attaching the airbag 10 to the vehicle C is formed on the other end 10B of the airbag 10 stored in the protecting portion 202 or 212, it is possible to easily attach the airbag 104 in a state where the airbag 104 is arranged in the protecting portion 202 or 212.

Further, since the protecting portion 202 or 212 is configured to include the curved wall portion 202b or 212b and the pair of straight wall portions 202a and 202c and 212a and 212c, it is possible to reliably and easily control the deployment direction of the airbag 10. Specifically, the curved wall portion 202b or 212b is configured such that a curved surface is formed along the perimeter of the rolled airbag 10 so as to include the slit 202f or 212f. The pair of straight wall portions 202a and 202c and 212a and 212c is configured to extend from both ends of the curved wall portion 202b or 212b to an outer region of the curved surface. Due to this configuration, when the airbag 10 starts to be deployed from a position near the slit 202f or 212f through which the tab 104 of the airbag 10 passes, the airbag 10 is pushed by repulsive force of the airbag 10 pressing the curved wall portion 202b or 212b in which the slit 202f or 212f is formed in the initial stage of deployment. Since the pair of straight wall portions 202a or 202c and 212a or 212c is configured to extend to an outer region of the curved surface, the straight wall portion may not disturb the airbag 10 that is deployed so as to be pushed from the curved wall portion 202b or 212b. Moreover, it is possible to suppress unnecessary expanding movement and to finely adjust the deployment direction.

In the cover 20 according to the present embodiment, it is preferable that the straight wall portions 202a and 202c and 212a and 212c are formed substantially along the tangential line of the curved surface at both ends of the curved wall portion 202b or 212b. Due to this configuration, the curved wall portion 202b or 212b and the straight wall portions 202a and 202c and 212a and 212c are connected more smoothly, and the deployment direction of the airbag 10 can be adjusted more smoothly.

Embodiments of the present invention have been described with reference to specific examples. However, the present invention is not limited to these specific examples. That is, those in which those skilled in the art add changes in design to these specific examples also fall within the scope of the present invention as long as they have the features of the present invention. For example, the components included in the respective specific examples and the arrangement, material, condition, shape, size, and the like thereof are not limited to those illustrated but can be changed appropriately. Moreover, the respective components included in the respective embodiments can be combined as long as it is technically possible, and the combinations thereof also fall within the scope of the present invention as long as they have the features of the present invention.

What is claimed is:

1. An airbag device for attachment to a body of a vehicle, the airbag device comprising:
    an airbag that is configured to be rolled from a first end to a second end and deployed upon receiving gas; and
    a cover disposed between the airbag and the body of the vehicle to which the airbag is attached, wherein
    the cover including:
    a protecting portion that is formed axially along the airbag; and
    a plurality of attachment portions extending from the protecting portion and configured to be attached to the body of the vehicle,
    a plurality of tabs configured to be attached to the body of the vehicle, the tabs being formed on the second end of the airbag located in the protecting portion,
    a deployment direction control structure formed in the protecting portion and configured to control a deployment direction of the airbag by changing a position by which the plurality of tabs passes toward the body of the vehicle in a rolling direction of the airbag,
    the deployment direction control structure including a plurality of slits being formed in a portion of the protecting portion adjacent to and aligned with the plurality of attachment portions and being configured to pass the plurality of tabs therethrough,
    the protecting portion including a curved wall section provided along a perimeter of the rolled airbag so as to include the plurality of slits, the protecting portion also including a pair of straight wall sections that extend from opposite ends of the curved wall section to form an outer extension of the curved wall section, and
    the curved wall section being formed along a region having an angular extent that is less than half of a perimeter of the rolled airbag, and the straight wall sections being formed substantially along tangential lines of the curved wall section at the both ends of the curved wall section.

2. The airbag device according to claim 1, wherein the plurality of slits being formed along an arrangement axis defined by a roll center of the airbag when the airbag is arranged along the protecting portion,
    the airbag being rolled so that a first rolled portion is rolled in a first rolling direction from the first end to the second end and that a second rolled portion is rolled in a direction opposite to the first rolling direction of the first rolled portion, and
    the second rolled portion provided between the slit and the first rolled portion.

3. An airbag device for attachment to a body of a vehicle, the airbag device comprising:
    an airbag that is rolled from a first end to a second end and deployed upon receiving gas, the airbag being rolled so that a first rolled portion extends in a first roll direction from the first end to the second end and that a second rolled portion extends in a direction opposite to the first roll direction of the first rolled portion, the airbag further having a plurality of tabs configured to be attached to the body of the vehicle and which are formed on the second end of the airbag,
    a cover positioned between the airbag that is rolled and the body of the vehicle to which the airbag is attached, the cover including a protecting portion provided along the second end of the airbag, the cover including a plurality of attachment portions that extend from the protecting portion and that are configured to be attached to the body of the vehicle,
    a plurality of slits formed in the protecting portion, the plurality of slits being located adjacent to the plurality of tabs and configured to allow one of the plurality of tabs to pass through each of the plurality of slits, and
    the plurality of tabs extending from the second rolled portion in a direction opposite to the first roll direction.

4. The airbag device according to claim 3, wherein the plurality of slits is formed in the protecting portion along an arrangement axis that is formed by a roll center of the airbag when the airbag is provided along the protecting portion.

5. The airbag device according to claim 4, wherein the plurality of slits includes first and second slits, the first and second slits being provided at such positions that the first and second slits are in a radially spaced relation to one another around the arrangement axis.

6. The airbag device according to claim 3, wherein the plurality of slits is provided adjacent to the plurality of attachment portions.

7. The airbag device according to claim 3, wherein a deformation restricting structure is formed on a side of the protecting portion opposite to the attachment portion and on a rear surface of the protecting portion that is opposite to a surface of the protecting portion making contact with the airbag so as to restrict deformation of the protecting portion when the airbag is deployed.

8. The airbag device according to claim 7, wherein the deformation restricting structure includes a projecting portion that protrudes from the rear surface, the projecting portion restricting deformation of the protecting portion whereby the projecting portion is configured to contact a weather strip of the vehicle when the airbag is deployed.

9. The airbag device according to claim 3, wherein a major portion of the tab extends in a direction opposite to the first rolled portion.

10. The airbag device according to claim 3, wherein a portion of the tabs are located between the attachment portion and a fastener.

\* \* \* \* \*